April 16, 1957 R. WEISS 2,788,724
MECHANISM FOR HOLDING FILM FLAT IN ROLL FILM CAMERAS
Filed Dec. 18, 1953 2 Sheets-Sheet 1

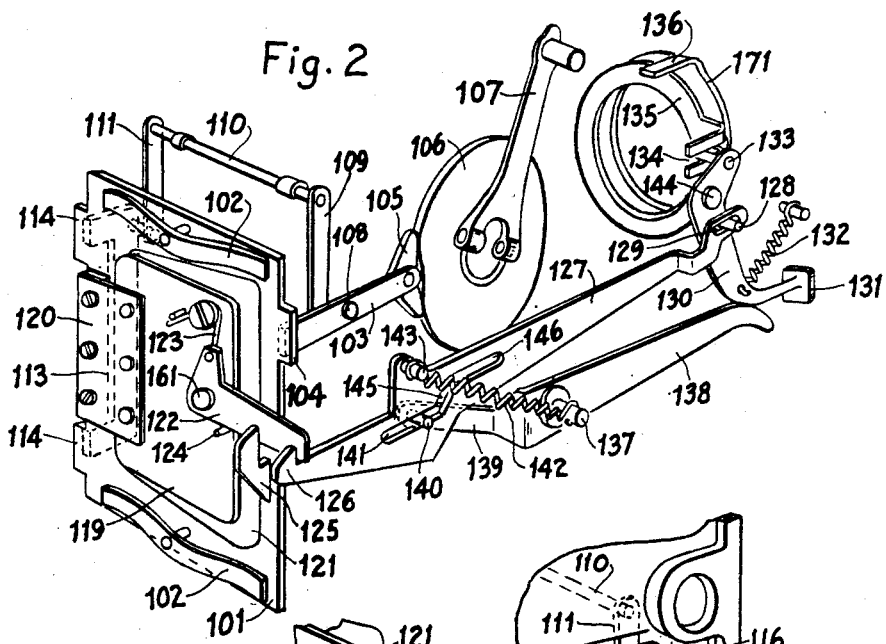

United States Patent Office 2,788,724
Patented Apr. 16, 1957

2,788,724

MECHANISM FOR HOLDING FILM FLAT IN ROLL FILM CAMERAS

Richard Weiss, Braunschweig, Germany, assignor to Franke & Heidecke, Fabrik Photographischer Prazisions-Apparate, Braunschweig, Germany, a German firm Application December 18, 1953, Serial No. 399,142

Claims priority, application Germany December 23, 1952

3 Claims. (Cl. 95—31)

This invention relates to a photographic camera, and especially to a camera of the roll film type, intended for use with conventional paper-backed film. In the past, there has sometimes been difficulty in holding the film flat in the focal plane or exposure plane of the camera, while an exposure was being made. Various film flattening arrangements have been suggested, but none has been entirely satisfactory.

An object of the present invention is the provision of improved means for holding the film flat in a roll film camera, particularly when using paper-backed film.

Another object is the provision of film flattening means so designed and constructed that it completely avoids any undue pressure on the front face of the film while the film is being advanced or fed, thus avoiding danger of scratching the film, and which at the same time serves adequately to hold the film flat against the focal plane support during the taking of the exposure.

Still another object is the provision of improved holding means for keeping the film flat, which is effective only for a relatively short time interval and which is activated or energized just before making the exposure, so that it will be effective to hold the film flat during the time that the exposure is made.

A further object is the provision of film flattening mechanism which is operatively connected to the shutter of the camera so that the setting or readying of the shutter for making an exposure serves also to tension the film flattening means ready for holding the film, and so that the actuation of an operating member to make an exposure serves also to actuate the film flattening means to hold the film flat during the making of the exposure.

These and other desirable objects may be attained in the manner disclosed as an illustrative embodiment of the invention in the following description and in the accompanying drawings forming a part hereof, in which:

Fig. 1 is a view partly in side elevation and partly in vertical section, of a camera equipped with a simple form of the present invention in which the film flattening means is operated manually and separately from the shutter mechanism;

Fig. 2 is a skeletonized or schematic perspective view of the operating parts of another embodiment of the invention, usually preferred, in which the film flattening means is operatively connected to and operated by movement of the film winding mechanism and the shutter mechanism, the parts being seen from the direction of the right rear corner of the camera looking toward the front left corner thereof, most of the conventional camera parts being omitted so as not to obstruct the showing of the parts relating to the present invention.

Fig. 3 is a perspective view similar to a fragment of Fig. 2, showing the parts in a different position;

Fig. 4 is another perspective view similar to a fragment of Fig. 2, showing the parts in still another position; and Fig. 5 is a schematic perspective view of parts near the left rear corner of the camera, viewed from the front.

The same reference numerals throughout the several views indicate the same parts.

Figure 1:
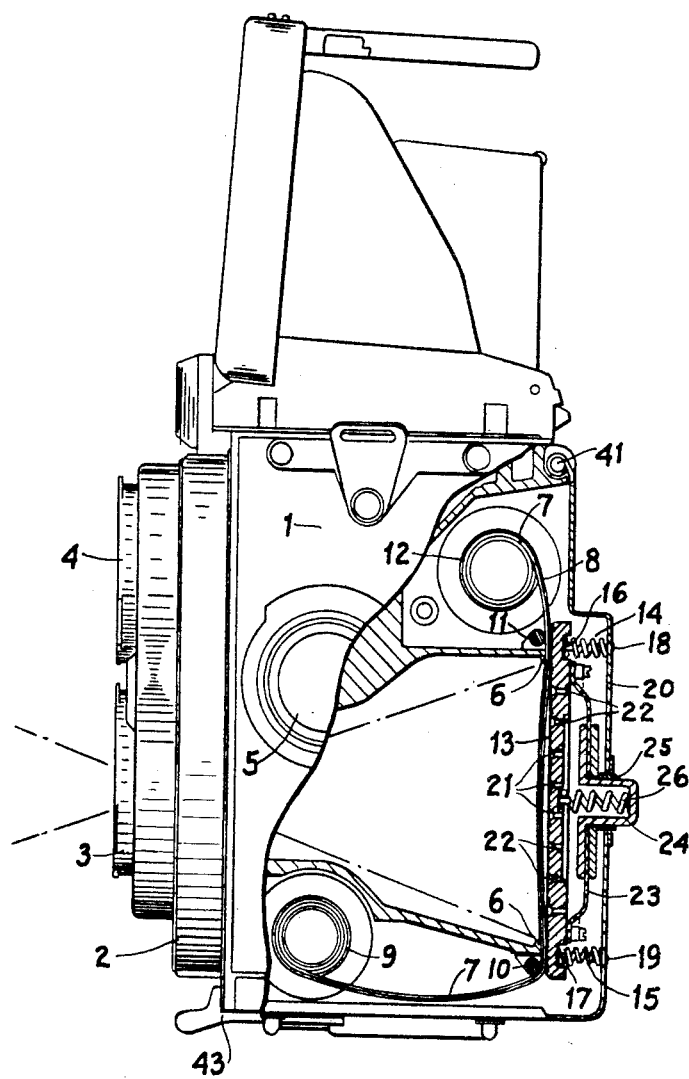

While the present invention, at least in its simplest form, is not limited to any particular kind or style of roll film camera, it is here disclosed by way of example in connection with a twin lens reflex camera identified by the trademark "Rolleiflex," manufactured by the firm of Franke & Heidecke, of Braunschweig, Germany, and widely known and used throughout the United States. The following disclosure of the invention presupposes familiarity with the main constructional features of the "Rolleiflex" camera, and for those not already familiar with the construction of this camera, reference may be made to the book "Rollei Photography, Handbook of the Rolleiflex and Rolleicord Cameras," by Jacob Deschin, published in 1952 by Camera Craft Publishing Company, of San Francisco, California.

Referring first to Fig. 1, the camera body is indicated in general at 1, and is provided with the usual front member 2 (movable backwardly and forwardly for focusing) which carries the lower or picture-taking objective or lens within the mount 3, and shutter associated therewith, and which carries also the upper or focusing lens within the mount 4. The camera, as well understood, is of the twin lens reflex type, the upper lens 4 serving to project an image of the scene onto a focusing screen arranged horizontally at the top of the camera body and surrounded by a collapsible focusing hood which is shown in its unfolded or extended position in Fig. 1.

The hood details are not important to the present invention, but those who may wish to understand the construction of the hood are referred to Bretthauer Patent 2,641,955, granted June 16, 1953, as well as to the book above mentioned. By turning the focusing knob 5 on the left side wall of the camera, the operator moves the front member 2 forwardly and rearwardly until the image of the desired scene is sharply focused on the screen, and when this has been accomplished, the lower or taking lens 3 is in position to project a sharply focused image of the scene onto the film in the focal plane support of the camera, the outline of the exposure area being defined by the fixed image aperture 6.

The film 7, with its usual backing paper strip 8 as customarily found in ordinary roll film, is drawn from the supply spool or roll 9 at the bottom of the camera, within the body but outside of the exposure chamber, and thence passes rearwardly over the guide roller 10 at the bottom of the exposure aperture, then upwardly past the exposure aperture to the upper guide roller 11, and is then wound up on the take-up spool 12. Normally, the winding is accomplished, after each successive exposure, by means of a winding crank mounted on the right hand side wall of the camera body, part of which crank is shown at 107 in Fig. 2 of the present drawings. Rotation of the crank serves to set or tension the shutter ready for the next exposure, as well as to wind enough film on the take-up roll 12 so as to bring a fresh unexposed portion or "frame" of film into the exposure area within the aperture 6. The operative connection between the crank, the take-up roll 12, and the shutter setting or tensioning parts may take, for example, the form shown in Muller Patent 2,148,636, granted February 28, 1939.

The focal plane support or film presser plate is indicated at 13 and is mounted within and supported from the camera back member 20 which is hinged to the camera body at 41 at the top of the rear side of the body and which extends downwardly across the rear of the body, thence in L-shaped form forwardly across the bottom of the body, and has its forward edge latched releasably to the body by the latch 43. According to the present invention, a partial vacuum is used, at the instant of exposure, to hold the film flat against the backing plate or focal plane support 13. In certain other types of cameras, such as process cameras used in the photoengraving field, it has been proposed to use vacuum for holding a film flat in a focal plane, but this has been done with film alone, without backing paper, and it has been generally supposed that vacuum could not be employed to flatten ordinary roll film, having the usual backing paper between the film and the support. However, it has been discovered according to the present invention, that, surprisingly, vacumm can be used to flatten ordinary roll film with backing paper, if proper procedures are followed.

Accordingly, the backing plate 13 of the present invention is pressed gently forwardly by means of compression springs 14 and 15 interposed between the backing plate and the back wall 20, which springs have their forward ends surrounding and guided by the pins 16 and 17 mounted on the plate 13, and have their rear ends surrounding and guided by the pins 18 and 19 fixed in the camera back member 20. The pressure plate 13 is extended upwardly and downwardly beyond the edges of the image aperture 6, so that the ends of the plate overlap the guide rollers 10 and 11. Thus the forward pressure of the plate compresses the film slightly against the guide rollers 10 and 11, serving to seal the film and backing paper to the backing plate 13 a little above the top and a little below the bottom of the exposure area.

The plate 13 is formed with passages or grooves 21 in its front face, at fairly close intervals to each other throughout substantially the entire exposure area, and of any desired pattern when viewed from the front, such as concentric squares or rectangles, with or without intersecting diagonals. Each of these grooves or passageways 21 in the front face of the plate 13 is connected to one or preferably several small bores 22 which extend through the plate 13 to the rear face thereof, the rear ends of all of these bores 22 being collectively enclosed within a resilient air-tight cover 23 of air-tight cloth or thin flexible metal, of approximately rectangular outline when viewed from the rear and sealed at all edges to the rear face of the plate 13.

A hollow stud 24 is fixed to the air chamber wall 23 approximately centrally thereof, as shown, the wall 23 being clamped, for example, between an annular flange which is integral with the stud 24, and another annular flange which screws onto threads formed externally on the stud. The rear end of the stud projects outwardly through, and is slidable in, an opening 25 in the camera back 20, and a compression spring 26, lying partly within the hollow stud 24, presses forwardly against the rear face of the film support plate 13 and thus tends to extend the stud to its rearmost position, carrying the flexible wall 23 rearwardly with it.

If the operator, after tensioning the shutter and immediately prior to making the exposure, pushes the projecting rear end of the stud 24 forwardly and then releases it, the forward pushing of the stud will tend to collapse the air pocket formed at the back of the support 13 by the flexible wall 23, and will push the air contained therein forwardly through the bores or openings 22 and allow it to escape into the interior of the camera around the side edges of the film. Upon release of forward pressure on the stud 24, the spring 26 will move the stud rearwardly, thus expanding the chamber 23, thereby lowering the air pressure therein, creating a partial vacuum which, through the bores 22 and grooves 21, will suck the film and its backing paper rearwardly and pull them tight and flat against the focal plane support 13. The suction or partial vacuum and the consequent flattening of the film is not permanent, of course, but in practice it will last for several seconds, holding the film flat for ample time within which to make any exposure of usual "instantaneous" duration or even a short "time" or "bulb" exposure.

With this arrangement, the image plane or focal plane of the camera is not determined by the rear edges of the masking members 6, but rather is determined by the position of the backing plate 13 which in turn is determined by the position of the rollers 10 and 11, preferably set so that the tangent line joining the rear faces of these two rollers to each other passes just a trifle to the rear of the rear faces of the masking parts or aperture parts 6. Thus the forward pressure on the plates 13 caused by the springs 14 and 15 will exert a quite compressive force in the direction of the thickness of the film and backing paper, against the rollers 10 and 11, sealing the film and backing paper against entrance of air at these points. The side edges of the film press against the usual side guides (not shown) which seal the film at these points. In this way, the only contact between the front or emulsion side of the film and any fixed or stationary member, during the feeding of the film, is at the lateral edges of the film, beyond the picture area, where any slight abrasions do not matter. The guide members at the top and bottom of the picture area, extending across the width of the film, are rollers rather than stationary members, so that no sliding occurs and there is no possibility of abrasion or other damage extending across the width of the film strip.

Reference is now made to Figs. 2–5, disclosing a second embodiment of the invention which operates on the same general principles above discussed, but in which the pneumatic suction means is automatically activated or tensioned (corresponding to pressing forwardly the plunger 24 in the first embodiment) by operation of the crank which feeds the film and sets the shutter, and which is tripped or released for producing the suction effect (corresponding to releasing the plunger 24 so that the spring may push it rearwardly) by the act of tripping the shutter to make the exposure.

Referring first to Fig. 2, this shows schematically the parts of the second embodiment of the invention, viewed in their operative relationship to each other but with the standard or conventional camera parts removed so that the mechanism of the present invention may be seen more readily. The entire construction, including the camera body, can be readily visualized, however, by one familiar with the "Rolleiflex" camera, if one will bear in mind that this perspective view is viewing the camera obliquely from the right rear corner toward the left front corner, and from a position a little above the top of the camera.

In this second embodiment, the focal plane support plate or film presser plate is indicated at 101, and is substantially the same as the plate 13 in the previous embodiment, having as before the same passageways or grooves on the front face of the plate and the same bores or air passages extending through the thickness of the plate. As before, the plate 101 is mounted within the hinged back of the camera, and is pressed forwardly by springs 102, which in this instance are shown as leaf springs rather than the coiled compression springs 14 and 15 of the previous embodiment. The plate 101 is mounted for limited forward and back-movement by means of guiding and supporting arms more clearly shown in Fig. 5, and which will be described hereafter. These guiding and supporting arms include an arm 103 extending forwardly near the right hand side wall of the camera and connected to a lateral lug 104 on the pressure plate 101. The forward end of the arm 103 carries a cam follower shoe or roller 105 which contacts with and rides on the periphery of a cam disk 106 fixed to the film winding and shutter tensioning handle 107, the cam 106 being so shaped that when the handle or crank 107 is rotated to feed the film, the cam will press rearwardly on the arm 103 and thereby press the presser plate or film support 101 rearwardly to a slight extent, relieving the pressure on the film. At the conclusion of film feeding, when the crank 107 is restored to its normal rest position, the low point of the cam 106 is opposite the follower 105, allowing the springs 102 to push the presser plate 101 forwardly again to its normal rest position determined by the position of the rollers 10 and 11 (Fig. 1).

The push rod 103 is connected by the pivot 108 to the lower end of a crank arm 109 fixed on a cross shaft 110 which extends laterally in the camera body, above the top of the exposure chamber. The left hand end of the shaft 110 has another depending crank arm 111 similar to the arm 109, and carrying at its lower end a pin 112 which lies in front of a U-shaped member 113, the two parallel arms of which are arranged approximately horizontally and are connected at their rear ends to lateral lugs 114 at the left edge of the presser plate or support plate 101. Pivot pins 115 connect the U-shaped member 113 at two spaced parts to the respective bellcrank levers 116 which are pivoted on fixed pivots in the camera body and which are each connected to one end of the link 117 which thus causes the two bellcranks 116 to move in unison, thereby insuring the parallel motion of the member 113 and a parallel motion of the left edge of the presser plate 101 which is connected to the member 113. At the same time, the cross shaft 110 and its arms 109 and 111 insure that the right edge of the presser plate 101 will move to the same extent as the left edge thereof. In this way, all positions of the presser plate 101, during its limited forward and backward movement, are exactly parallel to all other positions thereof. A coiled tension spring 118 (Fig. 5) pulling upwardly on one arm of the lower bellcrank 116, tends constantly to pull the U-shaped member 113 forwardly, thereby tending to keep the presser plate 101 in its forward position, assisted by the springs 102.

The expansible and contractible pneumatic chamber on the rear face of the presser plate 101 is in this instance formed by a resilient flexible member 121 similar to the member 23 in the first embodiment, and likewise sealed at its edges to the rear face of the plate 101, in position to surround all of the air ducts or bores which extend through the plate. But in this instance, instead of providing the resilient member 121 with a spring pressed stud for manual manipulation, like the stud 24 in the first embodiment, the rear face of the member 121 is covered by a rigid plate 119 of substantial area, which is hinged by the resilient hinge 120 to the left edge of the plate 101. It is the resilience of this hinge 120 which tends to pull the plate 119 rearwardly and thus to expand the pneumatic chamber formed by the member 121 and creates a suction or partial vacuum therein.

Mounted on and projecting rearwardly from the focal plane support plate 101 near the right edge thereof, is a hook-shaped member or latch keeper 125, which may under certain conditions be engaged by the latch 122 pivoted on the rear face of the pneumatic chamber plate 119 at 161 and urged clockwise (when viewed from the rear as in Figs. 2 and 3) by a spring 123. A stop pin 124 on the plate 119 serves to limit the maximum clockwise turning of the latch 122. The latch keeper or hook member 125 is so positioned that the latch 122 can engage behind this hook member (as seen in Fig. 2) only when the plate 119 is swung forwardly and the pneumatic chamber is compressed against the force of the spring hinge 120.

The pivoted latch member 122 is extended laterally beyond the hook member 125 into a position where it may also be engaged by a hook-shaped projection 126 on a draw bar 127 which extends forwardly and rearwardly along the right hand wall of the camera casing. As seen in Fig. 2, the hook 126 is able to engage the latch 122 without releasing the latter from the other hook or keeper 125.

In the rundown or rest position of the parts at the completion of making an exposure, the pneumatic chamber or bellows is fully expanded rearwardly and the latch 122 lies to the rear of the hooks 125 and 126. If the film winding handle 107 is now operated to wind a fresh area of film into the focal plane, ready for the next exposure, the cam 106 operating on the push link 103 will move the entire focal plane support or presser plate 101 rearwardly. But rear wall 119 of the pneumatic chamber or bellows cannot move rearwardly except through a very short distance (much less than the rearward range of movement of the plate 101) because it will come in contact with the front face of the camera back (not shown in Fig. 2, but indicated at 20 in Fig. 1) which will stop further rearward movement of the member 119. Consequently, the rearward movement of the plate 101 will cause the pneumatic chamber or bellows to be compressed between the plate 101 and the camera back, against the resilient force of the spring hinge 120, and the latch 122 will snap in place in front of the hook 125, thereby latching the bellows in its compressed or tensioned position. Upon continued rotation of the film winding handle 107, the rearward pressure on the link 103 is released so that the springs 102 and 118 may again press the support plate 101 forwardly to its normal rest position as determined by the engagement with the backing paper and film which are, in turn, pressed against the guide rollers 10 and 11 (Fig. 1). During this forward motion of the plate 101 and the bellows carried thereby, the latch 122 not only stays latched by the hook 125 but also snaps over and becomes engaged with the hook 126. At the conclusion of the motion of the winding handle 107, the parts are in the position shown in Fig. 2.

The camera shutter, associated with the lower or picture taking lens within the mount 3 (Fig. 1), is not specifically shown in the present drawing, but is familiar to those acquainted with the "Rolleiflex" camera above mentioned. The shutter is of the "set" type as distinguished from an automatic shutter, being constructed for example in the manner disclosed in Deckel Patent 1,687,123, granted October 9, 1928. Mounted on the shutter or on the associated lens mount, to rotate concentrically about the optical axis of the shutter and the lens, are two rings 135 and 171, rotation of the latter serving to set or tension the shutter and rotation of the former serving to trip or release the shutter to make an exposure after it has been set or tensioned. The operation of the crank handle 107 to feed the film automatically turns the shutter tensioning ring 171 to tension the shutter, in known manner not here important and not here shown. These two rings 135 and 171 correspond in general to the two rings 37 and 60 in said Muller Patent 2,148,636, except that in said patent it is the front ring which releases or trips the shutter and the rear ring which sets or tensions it, while in the present arrangement these rings are reversed, the ear 136 on the front ring 171 serving to engage the setting or tensioning lever of the shutter, such as the lever 6 in said Deckel Patent 1,687,123, while a lug on the rear ring 135 serves to engage the trigger or release lever of the shutter, such as lever 101 in said Deckel patent.

The manually accessible release or trigger for initiating the exposure is, in this instance, in the form of a lever 130 pivoted on a fixed stud 144 and urged by a spring 132 in a counterclockwise direction on its pivot (when viewed from the right hand side of the camera) so as to project the finger piece 131 forwardly. A lateral pin 133 on the release lever 130 engages a groove 134 on the release ring 135 above mentioned.

The above mentioned draw bar 127, having the hook 126 at its rear end, extends forwardly to the vicinity of the release lever 130 and is provided with a slot 129 which engages over a lateral pin or stud 128 on the release lever 130. On a fixed pivot 137 on the camera housing is a second arm or lever 138, 139, the forward end 138 of which engages just beneath the shutter release lever 130 in position to be depressed by rearward movement of the shutter release member. The other or rear end 139 of this lever carries a lateral pin 140 which engages in a slot in the draw bar 127, this slot having a longitudinally extending rear portion 141, a longitudinally extending forward portion 146 which is offset above the portion 141, and an inclined cam portion 145 connecting the portions 141 and 146. Thus if the bar 127 moves longitudinally forwardly or rearwardly relative to the pin 140 on the lever 138, 139, rearward longitudinal movement of the bar 127 will cause the pin 140 to pass through the inclined part 145 of the slot, depressing the rear end of the bar 127, while forward movement of the bar will cause the pin 140 to pass in the opposite direction through the inclined part 145 of the slot, raising the rear end of the bar 127. A coiled tension spring 142 having its forward end fixed to the pivot 137 of the lever 138, 139, and having its rear end fixed to a pin 143 on the bar 127, tends to pull the bar 127 resiliently forwardly.

It has already been mentioned above that turning the handle or crank 107 to feed the film and tension the shutter, serves to compress or activate the bellows ready for an exposure, and places the parts in the position shown in Fig. 2. Then when the operator presses rearwardly on the finger piece or trigger member 131 to make the actual exposure, he does not press this far enough to trip the shutter directly, but the slight rearward movement of the finger piece 131 and lever 130 serves to depress the forward end 138 of the two-armed lever 138, 139, thereby raising the rear end 139 thereof. This raises the pin 140, so as to raise the entire rear end of the bar 127, thus raising the latch 122 to the position shown in Fig. 3, so that it escapes from the hook or keeper 125. Then the spring of the hinge 120, being considerably stronger than the spring 142, swings the bellows plate 119 rearwardly, expanding the bellows and creating the suction which serves to hold the film and backing paper flat against the front face of the focal plane support plate or presser plate 101, for a few seconds.

While the bellows plate 119 moves rearwardly during expansion of the bellows, the hook 126 is still engaged with the latch 122, so that the rearward movement of the latch 122 pulls the hook 126 and the bar 127 rearwardly, overcoming the force of the spring 142. Through the connection of the slot 129 and pin 128, this rearward movement of the bar 127 draws rearwardly on the shutter release lever 130, and completes the movement of this lever which was only partially completed by manual finger pressure on the finger piece 131. The completion of rearward movement of the trigger or trip lever 130 completes the turning of the ring 135 and thereby trips the shutter to make the exposure. This occurs during the early part of the rearward movement of the bellows members 119 and 122. During the latter part of this rearward movement, the bar 127 is drawn sufficiently rearwardly so that the pin 140 moves along the inclined part 145 of the slot and into the front end portion 146 thereof, with the result that the rear end of the bar 127 is thereby depressed to the position shown in Fig. 4, bringing the hook 126 down below the bottom of the latch 122 and releasing the latch so that the spring 142 can now restore the bar 127 forwardly to its initial rest position. At the completion of the exposure, the bar 127 is thus in its forward position, and the bellows is completely expanded, with the latch 122 to the rear of the hooks 125 and 126 and not engaged with either of these hooks.

The parts are now ready for the next operation, which is the winding of the handle or crank 107, which will serve to tension or activate the bellows, to feed the film, and to tension the shutter ready for the next exposure. The cycle is repeated as often as desired, depending upon the number of exposure areas on the roll film.

The exact scientific reasons why this vacuum arrangement works satisfactorily with commercial roll film of the ordinary paper backed kind, may not be fully understood or explainable with certainty. Nevertheless, contrary to the normal expectation of prior workers in this field, the vacuum arrangement does work very satisfactorily, as shown by many successful tests. Possibly this may be due to the fact that the vacuum paper used on ordinary commercial roll film as commonly available on the market, is impervious to actinic light but slightly pervious or porous to air.

It is seen from the foregoing disclosure that the above mentioned objects of the invention are well fulfilled. It is to be understood that the foregoing disclosure is given by way of illustrative example only, rather than by way of limitation, and that without departing from the invention, the details may be varied within the scope of the appended claims.

What is claimed is:

1. The combination with a photographic camera body having an optical axis and two rollers mounted for rotation about substantially stationary axes arranged substantially parallel to each other and on opposite sides of said optical axis, the focal plane of the camera body being defined substantially by a common plane tangent to the rear faces of both rollers, of means for holding a roll of photographic film having on one face thereof a strip of backing paper substantially impervious to actinic light and slightly pervious to air, means for guiding successive portions of said film across said rollers with the film faced forwardly and in contact with the rollers and with said backing paper behind the film, a focal plane support plate mounted behind said film and backing paper and movable substantially in the direction of said optical axis, said support plate being of such dimensions as to overlap said rollers so that when said plate is moved axially forwardly it will press the film and backing paper together between said rollers and said support plate, first spring means tending to move said support plate forwardly toward said rollers, a plurality of air ducts extending through said support plate from the front face to the rear face thereof, an expansible vacuum chamber mounted on the rear face of said support plate, one wall of said vacuum chamber being formed by said support plate, means for collapsing said vacuum chamber, and second spring means tending to expand said vacuum chamber to create a partial vacuum tending to draw said film and backing paper rearwardly into flat contact with the front face of said support plate.

2. A photographic camera including a focal plane support plate, means for guiding photographic film across the front face of said support plate, a plurality of air ducts extending through said plate from the front face to the rear face thereof, an expansible vacuum chamber mounted on the rear face of said plate, the front wall of said chamber being formed by said support plate, the rear wall of said chamber being at least partially movable forwardly and rearwardly toward and away from said support plate, means for moving the entire support plate bodily rearwardly, abutment means limiting the rearward movement of said rear wall of said chamber when said support plate is moved rearwardly, so that when rearward movement of said support plate is continued beyond the point where said abutment means stops rearward movement of said rear wall, such rearward movement of said plate will cause said plate and rear wall to move closer to each other thereby to collapse said vacuum chamber, latching means for holding said rear wall in collapsed condition relative to said support plate when said support plate is again moved forwardly after a rearward movement thereof, manually operable means for unlatching said latching means, spring means tending to move said rear wall rearwardly away from said support plate, when unlatched, to expand said vacuum chamber to create a partial vacuum therein to tend to draw said film flat against the front face of said plate, a shutter tripping member, and means operated by expansion of said chamber for operating said shutter tripping member.

3. A construction as defined in claim 2, in which said means for unlatching said latching means and said means for operating said shutter tripping member both include a common link mounted for both longitudinal movement and transverse movement, and in which said link is moved transversely to unlatch said latching means and is then moved longitudinally to operate said shutter tripping member.

References Cited in the file of this patent

UNITED STATES PATENTS

| | | |
|---|---|---|
| 1,013,033 | Margius | Dec. 26, 1911 |
| 1,309,798 | Folmer | July 15, 1919 |
| 1,443,433 | Rockstroh | Jan. 30, 1923 |
| 1,645,923 | Ohlan | Oct. 18, 1927 |
| 2,333,835 | Wangerin | Nov. 9, 1943 |

FOREIGN PATENTS

| | | |
|---|---|---|
| 738,903 | France | Oct. 24, 1932 |
| 865,214 | France | Feb. 17, 1941 |